July 4, 1961  R. M. TILLMAN  2,991,414
ELECTRICAL APPARATUS

Filed Sept. 26, 1957  3 Sheets-Sheet 1

INVENTOR.
ROBERT M. TILLMAN
BY Edward W. Hughes
ATTORNEY

July 4, 1961 R. M. TILLMAN 2,991,414
ELECTRICAL APPARATUS
Filed Sept. 26, 1957 3 Sheets-Sheet 2
Fig. 6
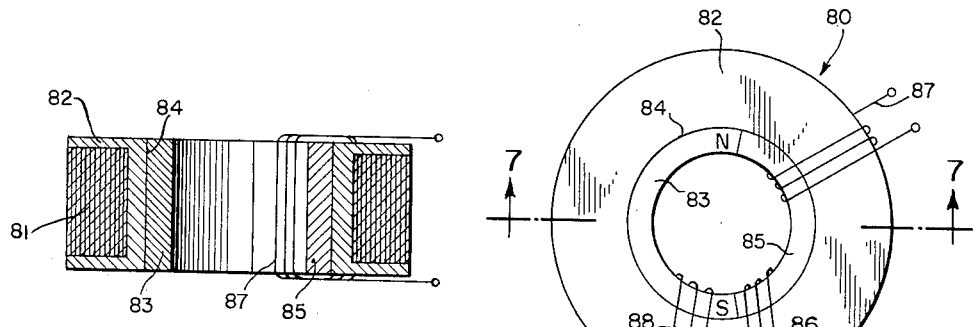
Fig. 7
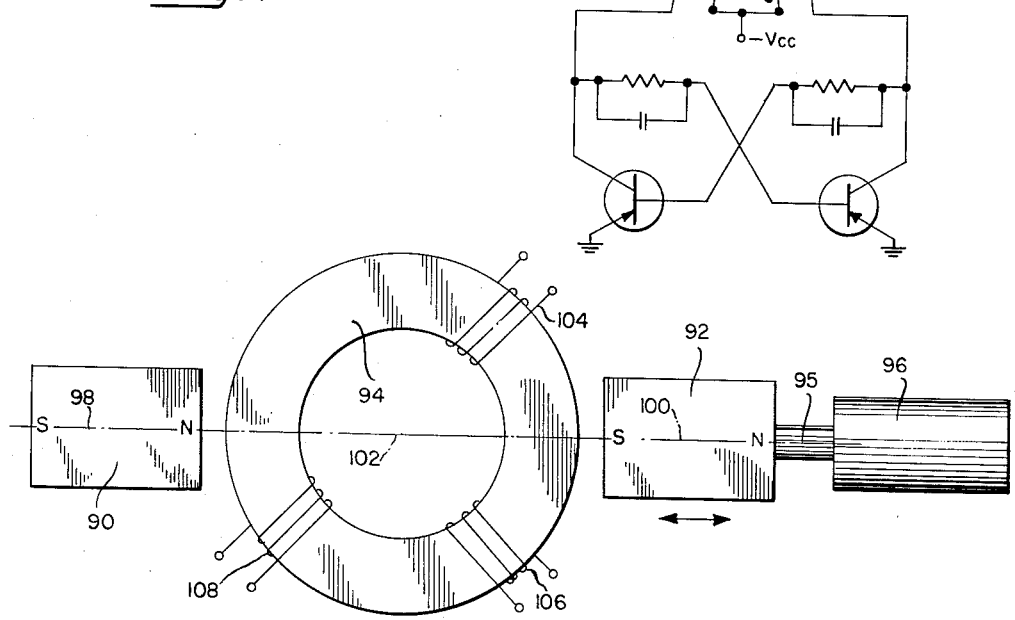
Fig. 8
INVENTOR.
ROBERT M. TILLMAN
BY Edward W. Hughes
ATTORNEY July 4, 1961  R. M. TILLMAN  2,991,414
ELECTRICAL APPARATUS
Filed Sept. 26, 1957  3 Sheets-Sheet 3

INVENTOR.
ROBERT M. TILLMAN
BY Edward W Hughes
ATTORNEY

United States Patent Office 2,991,414
Patented July 4, 1961

2,991,414
ELECTRICAL APPARATUS
Robert M. Tillman, Willow Grove, Pa., assignor to Burroughs Corporation, Detroit, Mich., a corporation of Michigan
Filed Sept. 26, 1957, Ser. No. 686,308
2 Claims. (Cl. 324—43)

This invention relates to methods and apparatus for controlling the magnitude of the switched flux of a device, or core, made from a magnetic material having substantially rectangular hysteresis loops, and more particularly to methods and apparatus for controlling the magnitude of the switched flux $\Phi_s$ of magnetic multivibrators by means of permanent magnetic fields. Switched flux $\Phi_s$ may be defined as being the total change of magnetic flux within a magnetic device as it changes, or switches, from its maximum positive value to its maximum negative value.

There have been developed oscillators in which their frequency of operation is a function of the magnitude of the switched flux $\Phi_s$ of the core with which each of such oscillator is provided. There have also been developed pulse generators in which the voltage time product of each output pulse produced by each such generator is determined by the magnitude of the $\Phi_s$ of the core with which each of such pulse generator is provided. Such oscillators and pulse generators will hereinafter be referred to as being magnetic multivibrators, either free-running or monostable. The four-winding oscillator disclosed in Patent No. 2,783,384 dated February 26, 1957, by R. L. Bright et al. and the two winding oscillator disclosed in U.S. patent application Serial No. 636,740, filed January 28, 1957, entitled Square Wave Oscillator, by R. M. Tillman, assigned to the assignee of this invention, and now Patent No. 2,912,653, are examples of free-running magnetic multivibrators. The pulse generator illustrated in FIG. 5 of Patent No. 2,591,406, dated April 1, 1952, by E. P. Carter et al. is an example of a monostable magnetic multivibrator.

It is characteristic of devices and cores made from magnetic materials having substantially rectangular hysteresis loops, that the magnitude of the $\Phi_s$ for each such core or device in a given circuit is substantially constant provided the temperature of each core is maintained constant. It is also apparently an inherent characteristic of such devices, or cores, that as their temperatures increase, the magnitude of their switched flux $\Phi_s$ decreases.

In free-running magnetic multivibrators, the frequency of oscillation is inversely proportional to the $\Phi_s$ of its associated core and directly proportional to the magnitude of the supply voltage. In monostable magnetic multivibrators, the pulse width of each pulse is directly proportional to the $\Phi_s$ of its associated core and inversely proportional to the magnitude of the supply voltage. If $\Phi_s$ and the turns ratios, in both cases, remain constant, then the frequency, or the pulse width, depending on the type of magnetic multivibrator, is a function of the applied voltage. In order to accurately maintain the relationship between applied voltage and frequency, or pulse width, it is necessary to maintain $\Phi_s$ constant. To maintain $\Phi_s$ constant, it has heretofore been necessary to keep the temperature of the magnetic cores of such magnetic multivibrator constant by locating the cores in constant temperature devices, such as ovens. The only way of compensating for changes of $\Phi_s$ due to temperature heretofore, has been by varying the magnitude of the supply voltage.

The earth is a permanent magnet. When the configuration of a magnetic device is such as to cause the lines of magnetic flux due to the earth's magnetic field to be of sufficient magnitude and to flow through the magnetic core of a magnetic multivibrator, the earth's magnetic field may be used to control the output of such magnetic multivibrator. The result is a new and novel magnetometer.

It is therefore an object of this invention to provide methods and apparatus for controlling the magnitude of the switched flux of a magnetic device by means of a permanent magnetic field.

It is a further object of this invention to provide methods and apparatus for reversibly controlling the magnitude of switched flux of a magnetic core of a magnetic multivibrator by varying permanent magnetic fields.

It is still a further object of this invention to provide methods and apparatus for controlling the magnitude of switched flux of a magnetic core of a magnetic multivibrator as a function of one or more independent variables.

It is another object of this invention to provide an improved magnetometer.

It is still a further object of this invention to provide an improved transducer for converting linear position to frequency.

It is another object of this invention to provide an improved transducer for converting angular displacement to frequency.

It is still another object of this invention to provide improved means for compensating for changes in the magnitude of the switched flux of the core of a magnetic multivibrator with changes in temperature of said core.

Other objects and many of the attendant advantages of this invention will be readily appreciated as the same become better understood by reference to the following detailed description when considered in connection with the accompanying drawings wherein:

FIG. 6 is a plan view of a magnetic core with permanent magnet mounted within it;

FIG. 7 is a section taken on line 7—7 of FIG. 6;

FIG. 8 is a schematic plan view of a recilinear transducer;

Figure 1:
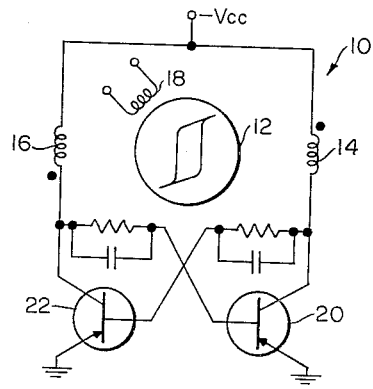
FIG. 1 is a schematic diagram of a free-running magnetic multivibrator.
Figure 2:
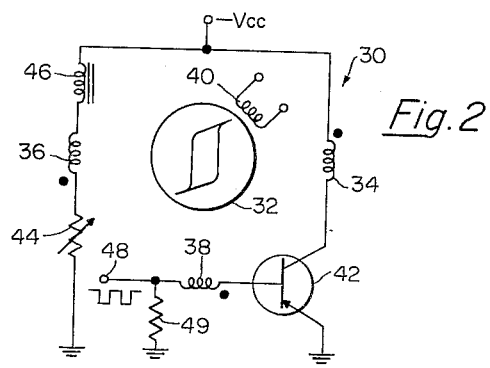
FIG. 2 is a schematic diagram of a monostable magnetic multivibrator.

FIGS. 1 and 2 are schematic diagrams of a free-running magnetic multi-vibrator and a monostable magnetic multivibrator respectively. In FIG. 1 the free-running magnetic multivibrator, or oscillator, 10 is of the type disclosed in U.S. patent application Serial No. 636,740 referred to above, and is comprised of a core 12 made from a magnetic material which has substantially rectangular hysteresis loops such as "4–79 molybdenum Permalloy." On core 12 there are wound windings 14 and 16, which have the same number of turns, and an output winding 18. One terminal of each of the windings 14, 16 is dotted. This symbolization is used to indicate the direction in which windings 14, 16 are wound on core 12 and by definition, conventional current flowing into a dotted terminal will cause the resultant magnetic field H to be negative, and current flowing out of a dotted terminal will cause the magnetic field H to be positive. The undotted terminal of winding 14 is connected to the collector of junction transistor 20 which is illustrated as being a pnp transistor. The collector of junction transistor 22 is connected to the dotted terminal of winding 16. The dotted terminal of winding 14 and the undotted terminal of winding 16 are connected to a D.C. source of collector supply potential, $-V_{cc}$, which is not illustrated. The collector of transistor 22 is connected by a parallel resistor-capacitor coupling network to the base of transistor 20, and the collector of transistor 20 is similarly connected by a similar resistor-capacitor coupling network to the base of transistor 22.

Figure 3:
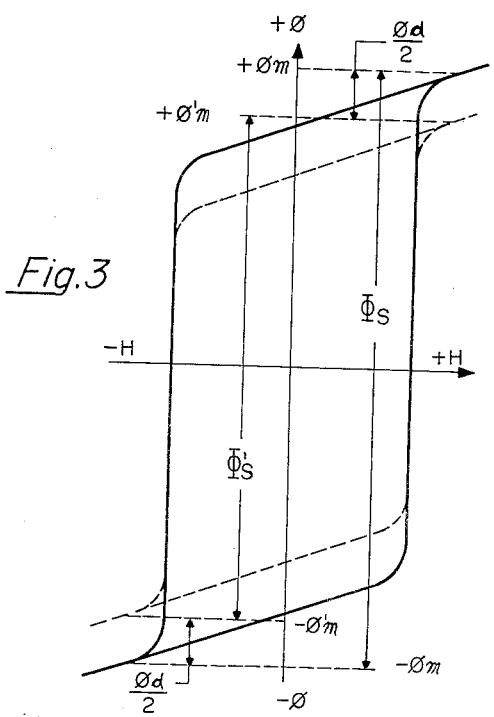
FIG. 3 is an idealized hysteresis loop of a magnetic material.

When a suitable source of unidirectional potential $-V_{cc}$ is connected through windings 14, 16, to the collectors of transistors 20, 22, one of these transistors will begin to conduct more heavily than the other. If, for example, it is transistor 20, then current will begin to flow through winding 14 to establish a $+H$ field. If H is sufficiently large, the flux $\phi$ in the core will increase in the positive direction until it reaches a maximum positive value $+\phi_m$ as illustrated in FIG. 3. Changes in $\phi$ induce voltages in winding 16 which will tend to keep transistor 20 conducting heavily. When the flux in core 12 reaches a flux value of $+\phi_m$, the coupling between windings 14, 16, becomes insufficient to bias transistor 20 to cause any further positive increase in H. Transistor 20 begins to cut off which decreases H, with a consequent decrease in the magnitude of flux $\phi$ in the circuit which, in turn, induces voltages in winding 14, 16, which quickly shut off transistor 20 and turn on transistor 22. After a few cycles, the charges built up across the capacitors of the coupling networks act to more quickly cut off the "on" transistor and to hold the off transistor "off" during the switchover transient which decreases the transistor switching time. Transistors 20, 22, operate substantially as switches, so that the voltage across the winding in the collector circuit of the conducting transistor substantially equals the collector supply voltage.

The relationship between the potential $v$ in volts across a winding on a core and the rate of change of $\phi$ in maxwells in the core is given by the following:

$$v = 10^{-8} N \frac{d\phi}{dt} \qquad \text{Equation 1}$$

Substituting $V_{cc}$ for $v$ in Equation 1, and integrating Equation (1) provides:

$$V_{cc} \int_0^{T/2} dt = 10^{-8} N \int_{-\phi_m}^{+\phi_m} d\phi \qquad \text{Equation 2}$$

$$V_{cc} T = 2 \times 10^{-8} N \Phi_s \qquad \text{Equation 3}$$

$$T = \frac{2 \times 10^{-8} N \Phi_s}{V_{cc}} \qquad \text{Equation 4}$$

where:

$\Phi_s = 2\phi_m$ $t$ = time in seconds
$N$ = number of turns
$T$ = period for the core to complete one cycle Assuming that the switching times of the transistors of the magnetic multivibrators are negligible, it is obvious from Equation 4 that if $\Phi_s$ is constant then the time T it takes a core to switch through one complete cycle is an inverse function of the applied voltage, $V_{cc}$. However, if $V_{cc}$ is kept constant, then the magnitude of T varies directly as $\Phi_s$ since N is a constant. For a more detailed explanation of the operation of the free-running multivibrator, see the above referred to patent application.

FIG. 2 is a schematic diagram of a monstable magnetic multivibrator. It differs from the magnetic multivibrator illustrated in the patent to Carter et al. referred to above, in that a transistor is used as the electrical amplifying device, or switch, instead of an electron tube. Monostable magnetic multivibrator, or pulse generator, 30 is comprised of a core 32, which is preferably toroidal and formed of a magnetic material having substantially rectangular hysteresis characteristics, similar to core 12 of oscillator 10. Wound on core 32 is a collector winding 34, a D.-C. bias winding 36, a base winding 38 and an output winding 40. The significance of the dotted terminals of windings 34, 36, 38, is the same as for the device illustrated in FIG. 1. The collector of junction transistor 42 which is illustrated as being a pnp transistor is connected to the undotted terminal of winding 34. The undotted terminal of winding 36 and the dotted terminal of winding 34 are connected to a suitable source of direct current potential, $-V_{cc}$, which is not illustrated. The dotted terminal of winding 36 is illustrated as being connected through variable resistor 44 to ground. Inductor 46 is connected in series with bias winding 36 and variable resistor 44 to reduce variations in the magnitude of the current flowing through bias winding 36.

As long as no trigger pulse is applied to input terminal 48, the base of transistor 42 will be substantially at ground potential because of resistor 49, transistor 42 will be cut off, and substantially no current will be flowing through winding 34. The value of resistor 44 is chosen so that the magnitude of current flowing through bias winding 36 will maintain the flux in core 32 at its maximum negative value $-\phi_m$, for example. The application of a negative pulse of sufficient amplitude and duration to input terminal 48 and to the base of transistor 42 through base winding 38 causes transistor 42 to begin to conduct. Collector current of transistor 42 flowing through winding 34 creates a positive magnetic field of sufficient strength to cause core 32 to change its magnetic state from $-\phi_m$ to $+\phi_m$. Windings 34 and 38 are regeneratively coupled so that as core 32 is switched from a flux value of $-\phi_m$ to $+\phi_m$ the potential of the dotted terminal of winding 38 is sufficiently negative to maintain transistor 42 conducting heavily until the flux in core 32 reaches the value of $+\phi_m$. When this point is reached, the coupling between windings 34, 38 is insufficient to bias transistor 42 sufficiently to produce a further increase in H or $\phi$. The voltage induced in winding 38 decreases, and transistor 42 quickly cuts off. The current flowing through winding 36 then returns the magnetic flux in core 32 to $-\phi_m$ where it remains until a subsequent trigger pulse is applied to the base of transistor 42.

When transistor 42 is conducting heavily, practically all the voltage drop, substantially equal to $V_{cc}$, occurs across collector winding 34. Even when $V_{cc}$ is slowly varying in magnitude, the period of the changes in $V_{cc}$ is so much greater than the width of the pulses produced by generator 30 that $V_{cc}$ can be considered to be constant. Thus, since $V_{cc}$ is constant, or can be assumed to be constant, it follows from Equation 1 that $$\frac{d\phi}{dt}$$

the rate of change of $\phi$ with time in core 32 will be substantially constant. Therefore, the amplitude of the voltage pulse induced in output winding 40 will be substantially constant, and will be determined by the magnitude of $V_{cc}$. Equation 3 shows that the voltage time product of each output pulse will be determined by the magnitude of the $\Phi_s$ of core 32 since N is a constant, and the width of each output pulse will vary directly with $\Phi_s$.

According to the most widely accepted theory of magnetization, any magnetic material consists of a large number of very small domains, each domain, though small, is comprised of a large number of atoms. The absolute value of the magnetization of each domain is constant due to the interaction forces within each domain. A magnetic device is saturated when all its magnetic domains are aligned. However, it takes a magnetic field of very great strength to saturate, as defined above, a magnetic device.

A core such as core 12 of free-running magnetic multivibrator 10, has maximum and minimum values of magnetic flux corresponding to $+\phi_m$ and $-\phi_m$ as seen in FIG. 3. The value of the switched flux $\Phi_s$ is:

$$\Phi_s = \phi_m - (-\phi_m) = 2\phi_m \qquad \text{Equation 5}$$

If a control magnetic field $H_d$ is established in magnetic device such as core 12, a certain number of the magnetic domains of core 12 corresponding to a magnetic flux $\phi_d$ will substantially align themselves with $H_d$. The number of such domains, or the magnitude of $\phi_d$ controlled by, or held captive, is determined by the magnitude of the control field $H_d$. When no control field $H_d$ exists, the maximum values of the switched flux correspond to $\Phi_s$. When a control field $H_d$ exists, the maximum value of the switched flux of a free-running multivibrator, for example, correspond to $+\phi_m'$ and $-\phi_m'$ as illustrated in FIG. 3. The magnitude of the switched flux $\Phi_s'$ when a control field $H_d$ exists, is:

$$\Phi_s' = \phi_m' - (-\phi_m') = 2\phi_m' \qquad \text{Equation 6}$$

The relationship between $\Phi_s'$ and $\Phi_s$ is:

$$\Phi_s' = \Phi_s - \phi_d \qquad \text{Equation 7}$$

Figure 4:
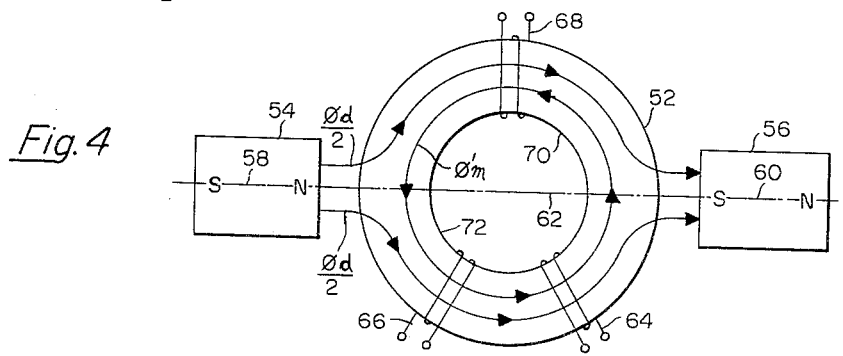
FIGS. 4 and 5 are schematic plan views of a core of magnetic material illustrating how a control magnetic field can control the magnitude of switched flux.
Figure 5:
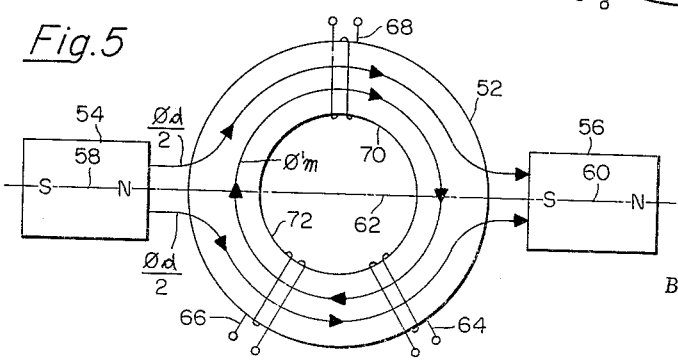

FIGS. 4 and 5 are plan views of a toroidal core 52 made of a magnetic material having substantially rectangular hysteresis loop. Lines of magnetic flux are drawn in core 52 to illustrate a proposed theory of how a control magnetic field due to permanent magnets 54, 56 regulate or control of the magnitude of the switched flux $\Phi_s'$ of a magnetic device or core such as toroidal core 52. Permanent magnets 54, 56, are mounted by conventional means which are not illustrated, so that the axis through their respective north and south poles, axes 58, 60, are substantially coincident with diameter 62 of core 52. Windings 64, 66, and 68 are wound around core 52. The number of turns of windings 64, 66, 68 illustrated are symbolic. The actual number of turns in each winding is determined by the intended application of the circuit. Windings 64, 66 may correspond with windings 14, 16 of free-running magnetic multivibrator 10 illustrated in FIG. 1, and winding 68 may correspond to the output winding 18. In such a case, core 52 would correspond to core 12. A fourth winding would be necessary if core 52 is to be associated with a monostable magnetic circuit such as is illustrated in FIG. 2. If control magnets 58, 60 were not present, the magnitude of the switched flux of a magnetic material of core 52 would be at its maximum value $\Phi_s$. $\Phi_s$ is determined by the characteristics of the material from which core 52 is made, including its temperature and the characteristics of the magnetic multivibrator associated with windings 64, 66 and 68.

Permanent magnets 54, 56, will establish within core 52 a control magnetic field $H_d$, and control magnetic flux $\phi_d$ will exist in core 52. The control magnetic circuit exists from the north pole of magnet 54 through core 52 to the south pole of magnet 56, through magnet 56 to its north pole, thence through the air to the south pole of magnet 54 and through magnet 54 to the north pole of magnet 54. Since control magnets 54, 56 are mounted so that their axes 58, 60 are substantially coincident with diameter 62 of core 52, approximately half the control flux $\phi_d$ will flow through the portion or segment 70 of core 52 on one side of diameter 62 and the other half will flow through the portion of segment 72 on the other side of diameter 62. It can, therefore, be assumed that control flux of the value $$\frac{\phi_d}{2}$$

exists in segment 70 and control flux of the value $$\frac{\phi_d}{2}$$

will exist in segment 72. Magnetic flux due to current flowing through winding 66 of a free-running magnetic multivibrator such as is illustrated in FIG. 1 may be assumed to establish a closed loop within core 52 having the direction, or polarity, indicated in FIG. 4. When the magnitude of the flux in leg 72, due to electric current flowing through winding 66, has a value equal to $\phi_m'$, the total magnetic flux in leg 72 will be $$\phi_m' + \frac{\phi_d}{2} = \phi_m$$

The value of the flux in segment 72 will then have the value $\phi_m$ at which regeneration can no longer be sustained. Current will then begin to flow through winding 64 and establish within core 52 a magnetic field of opposite direction, or polarity, due to current flowing through winding 66. The direction, or polarity, of magnetic flux when current is flowing through winding 64 is illustrated in FIG. 5. When the flux due to the current in winding 64 reaches the value of $\phi_m'$ in leg 70, the total value of the flux in leg 70 will have the value $\phi_m$ at which regeneration can no longer be sustained. Current will then begin to flow through winding 66 to drive core 52 back to its initial magnetic state or condition.

Any change in the magnitude of the control flux $\phi_d$ will effect the magnitude of the switched flux $\Phi_s'$ of core 52. Thus, by increasing or decreasing the magnitude of the control flux $\phi_d$, for example, by changing the relative position of permanent magnet 54 with respect to core 52, the magnitude of the switched flux $\Phi_s'$ of core 52 may be varied. Since the magnitude of the switched flux determines the frequency of a free-running oscillator or the pulse width of a pulse generator, assuming that the supply voltage remains constant and the number of turns in the windings is constant, one is thus able to vary the output signal of a magnetic multivibrator by controlling the magnitude of the switched flux $\Phi_s'$.

Figure 13:
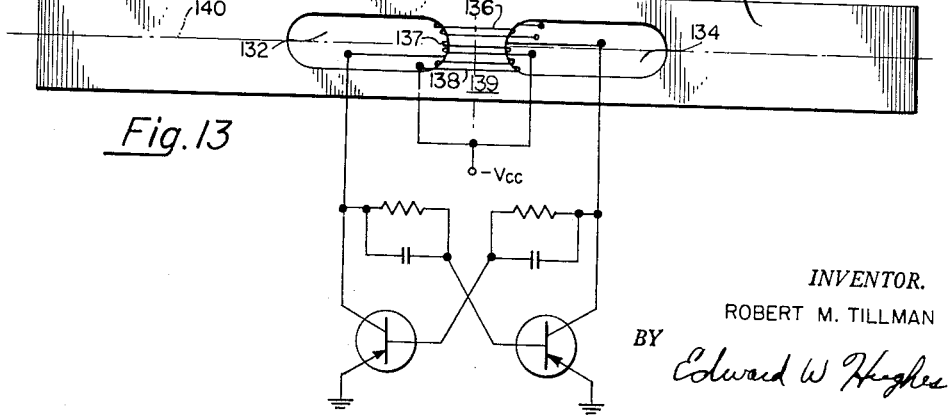
FIG. 13 is a plan view of a second form of the magnetic core of a magnetometer.

All the species described and claimed in this application, except that illustrated in FIG. 13, use cores having a single central or auxiliary opening similar to core 52 illustrated in FIGS. 4 and 5. In FIG. 13 the core of the magnetic multivibrator is provided with a pair of auxiliary openings. The application of the above explanation to a core such as that illustrated in FIG. 13 is believed to be straight forward. However, a more detailed description of the control of the switched flux of a core of configuration illustrated in FIG. 13 is found in U.S. patent application Serial No. 686,309 filed September 26, 1957, by Robert M. Tillman and James D. Henry, entitled Electrical Apparatus, which application is assigned to the assignee of this application.

It is not essential that control flux be divided equally through each half of the cores as described above. Even if all the control flux exists within only one segment of core 52, the relationship between $\Phi_s$, $\Phi_s'$ and $\phi_d$ set forth in Equation 7 remains valid. In so far as the output signal produced by a magnetic multivibrator is concerned, only the magnitude of control magnetic flux $\phi_d$ is important, and not how it may divide within a core such as core 52.

As stated earlier, it appears to be an inherent characteristic of magnetic material that the magnitude of $\Phi_s$ decreases with an increase in the temperature of the material. The rate of change of the switched flux with temperature is:

$$\frac{\Delta \Phi_{s_t}}{\Delta T} = -K_1 \qquad \text{Equation 8}$$

The remanent magnetic flux $\phi_r$ of permanent magnets also decreases with temperature. The rate of change of the remanent flux of a permanent magnet with temperature is:

$$\frac{\Delta \phi_r}{\Delta T} = -K_2 \qquad \text{Equation 9}$$

When a permanent magnet is located physically close to a magnetic core, or device, a change in the remanent magnetic flux of the permanent magnet will cause a change in the switched flux of the core. The rate of change of switched flux $\Phi_s$ of the core with respect to changes in the remanent flux $\phi_r$ of the permanent magnet is:

$$\frac{\Delta \Phi_{s_m}}{\Delta \phi_r} = -K_3 \qquad \text{Equation 10}$$

The magnitude of the coefficient $K_3$ can be varied by varying the cross-sectional area of the permanent magnet and by varying the distance between the magnet and the core. The object is to make the change of switched flux of the core equal to "0" for any change in T, or this may be expressed as follows:

$$\Delta \Phi_{s_{total}} = 0, \text{ at any } \Delta T \qquad \text{Equation 11}$$

or $$\Delta \Phi_{s_t} + \Delta \Phi_{s_m} = 0 \qquad \text{Equation 12}$$

Substituting Equations 8, 9 and 10 in Equation 12 provides:

$$-K_1 \Delta T + K_3 \Delta \phi_r = 0$$
$$-K_1 \Delta T + (-K_3)(-K_2)\Delta T = 0$$

$$K_3 = \frac{K_1}{K_2} \qquad \text{Equation 13}$$

The coefficients $K_1$ and $K_2$ are inherent with the materials from which the magnetic core and the permanent magnet are formed. The magnitude of coefficient $K_3$ is controlled by varying the cross-sectional area of the permanent magnet, and/or by varying the location of the permanent magnet with respect to the core. By proper choice of size and/or location it is thus possible to substantially compensate for any change in switched flux of a core within the range of temperatures where Equation 13 is satisfied.

It is desirable that the coefficient $K_2$ of the permanent magnet be fairly large and linear over a broad range of temperatures. It is also desirable that changes in the remanent value of the flux of the permanent magnet be substantially linear and reversible, i.e., that the value of $\phi_r$ for each temperature of the permanent magnet have the same value after the magnet has cycled between maximum and minimum temperatures. "Indox 1," a barium oxide ceramic material produced by the Indiana Steel Products Company, Valparaiso, Indiana, is one example of a permanent magnetic material having such properties. It is also desirable that the strength of the control field be sufficiently below the coercive force of the core so that changes in the magnitude of the control field will produce substantially reversible changes in the magnitude of the switched flux of the core.

In FIG. 6 there is illustrated one method of obtaining temperature compensation for a core 80 which may be formed by winding a thin ribbon, 81 of "4–79 molybdenum Permalloy," on a bobbin 82 made of non-magnetic material such as stainless steel. Permanent magnet 83 is shaped to fit within central circular opening 84 of bobbin 82. In order for the inner boundary of the bobbin-permanent magnet combination to form a continuous circle, arcuate segment 85, which is made of a suitable non-magnetic material, complements magnet 83. Magnet 83 and segment 85 are secured to bobbin 82 by any suitable means. Permanent magnet 83 may be made of any suitable magnetic material and its size is chosen so as to satisfy Equation 13. Windings 86, 87, 88, illustrated schematically, are wound around core 80. Windings 86, 88 are illustrated as being connected to form a free-running magnetic multivibrator such as is illustrated in FIG. 1. Winding 87 is the output winding of the circuit. Since magnet 83 and core 80 are in close proximity to one another, their temperatures should be substantially equal, should vary together, and should not differ markedly from ambient temperatures. Over a temperature range where Equation 13 is satisfied, the magnitude of the switched flux of core 80 will not change with temperature, and the output signal of a magnetic multivibrator having such a core will undergo no changes due to variations in the temperature of core 80 within said range.

FIG. 8 is a schematic diagram of a linear transducer comprised of permanent magnets 90, 92 and toroidal magnetic core 94. Magnet 90 and core 94 are substantially immovably mounted with respect to one another by any suitable means which are not illustrated. Permanent magnet 92 may be mounted on a movable arm 95 of linear actuator 96. Magnets 90, 92 are mounted so that their longitudinal axes, 98, 100, the axes through their respective poles, are aligned with a diameter 102 of core 94. Actuator 96 is capable of causing rectilinear movement of magnet 92 with respect to core 94 along axes 100, 102. Such movement will change the distance between the south pole of the magnet 92 and core 94, for example. Any such change has the effect of varying the air gap of the magnetic circuit from magnet 92 through core 94 to magnet 90, and thus the reluctance of the control magnetic circuit. A change of position of magnet 92, will therefore vary the magnitude of the control flux $\phi_d$ existing in core 94. The windings of free-running magnetic multivibrator such as windings 104, 106, 108 may be wound on core 94. Windings 106, 108 can be connected to form a free-running magnetic multivibrator in the same manner as windings 86, 88 in FIG. 6. The frequency of the magnetic multivibrator will be a function of the position of permanent magnet 92 with respect to core 94. The particular manner of mounting the magnets with respect to the core is not significant as long as a rectilinear movement of one magnet with respect to core 94 will cause a variation in the magnitude of the control flux in core 94.

Figure 9:
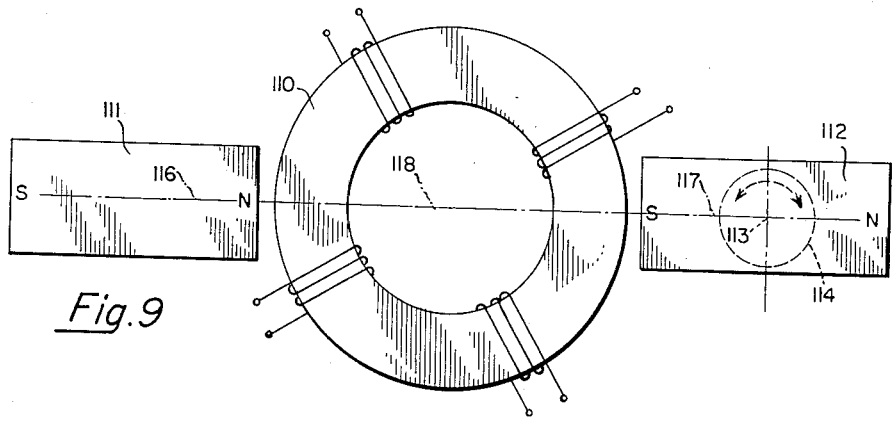
FIG. 9 is a schematic plan view of an angular transducer.
Figure 10:
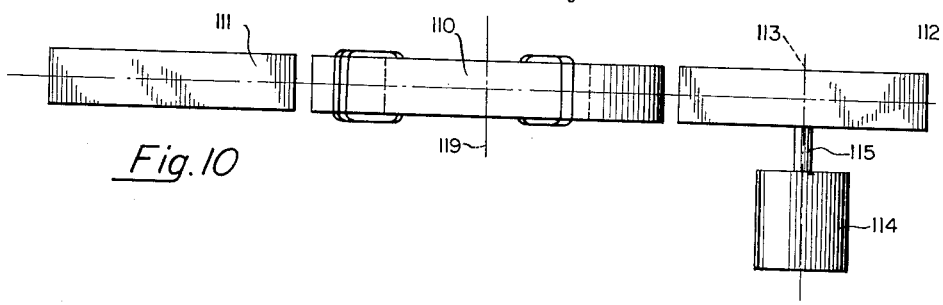
FIG. 10 is a side elevation of the device illustrated in FIG. 9.

In FIGS. 9 and 10 there is illustrated a rotational transducer comprised of a toroidal magnetic core 110 which is fixedly mounted with respect to a permanent magnet 111 by conventional means which are not illustrated. Permanent magnet 112 is mounted for rotation about axis 113 by means such as a servo motor 114 and shaft 115. Magnets 111, 112 have respectively longitudinal axes 116, 117, which axes extend through the respective north and south poles of magnets 111, 112. Magnet 111 is fixedly mounted with respect to core 110 so that axis 116 of magnet 111 is substantially aligned with diameter 118 of core 110. Magnet 112 is mounted so that its axis of rotation 113 substantially intersects diameter 118 of core 110. Axis of rotation 113 also intersects at right angles the longitudinal axis 117 of magnet 112 substantially in the center of magnet 112. Axis 113 is also substantially parallel to axis 119 of core 110. As magnet 112 rotates about axis 113, the magnitude of the control field $\phi_d$ established in core 110 will vary substantially sinusoidally to vary the magnitude of the switched flux of core 110. Four sets of windings, the number necessary for a monostable magnetic multivibrator such as illustrated in FIG. 2, are illustrated as being wound on core 110. Magnet 112 can be mounted on one side of core 110 so that its axis of rotation coincides with the axis 119 of core 110. In such case, magnet 111 would be fixedly mounted with respect to core 110 on the other side thereof with its longitudinal axis 116 intersecting substantially at right angles axis 119, with the intersection occurring substantially in the center of magnet 111.

Core 94, illustrated in FIG. 8, and core 110, illustrated in FIGS. 9 and 10, may have temperature compensating means provided as described above and illustrated in FIGS. 6 and 7. In such cases, the output signal of the magnetic multivibrator associated with cores 94, 110, will be only a function of one independent variable;

namely, the positions of the respective movable permanent magnets with respect to the cores, and not of the temperature of the cores. The strength of the control field established in cores 94, 110 is preferably well below the coercive force of the respective cores so that changes in control flux will be substantially reversible.

Figure 11:
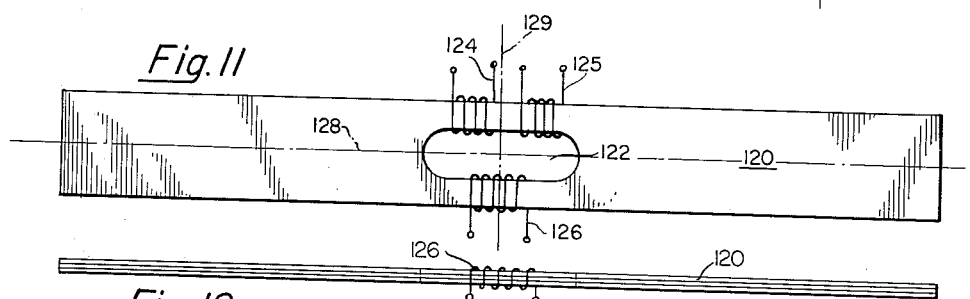
FIG. 11 is a plan view of a magnetic core of a magnetometer.
Figure 12:
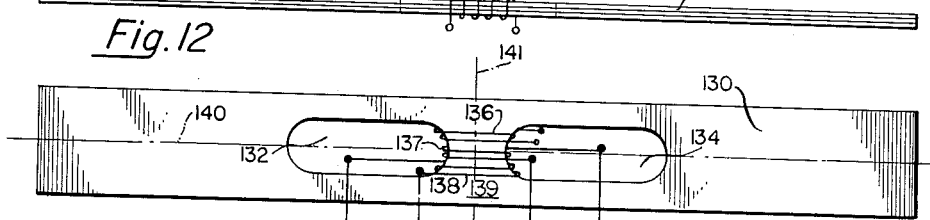
FIG. 12 is a side elevation of the device illustrated in FIG. 11.

FIG. 11 is a plan view of one configuration a core of a magnetic multivibrator may assume to form a magnetometer. FIG. 12 is a side elevation of the core. Core 120 is made from magnetic material having substantially rectangular hysteresis loops and is made relatively long and thin. In a preferred embodiment it is made of a plurality of thin laminations as seen in FIG. 12. Centrally located in core 120 there is formed an elongated auxiliary opening 122. Wound through opening 122 are windings 124, 125, 126, which are schematically illustrated and which may correspond respectively to windings 14, 16 and 18 of a magnetic multivibrator such as illustrated in FIG. 1.

FIG. 13 is a plan view of a second configuration a core of a magnetic multivibrator may assume to form a magnetometer. Core 130 is similar in construction to core 120 except that it has a pair of substantially equal sized elongated auxiliary openings 132, 134 formed through it. In this embodiment, windings 136, 137, 138, which are illustrated schematically, are wound through openings 132, 134 and around common leg 139, the material of core 130 between openings 132, 134. Openings 132, 134 are located so that the width of the core material between the sides of core 130, and the sides of openings 132, 134 are substantially equal. The width of leg 139 is made equal to or greater than twice the width of the material between openings 132, 134 and the sides of core 130. This prevents the flux density in leg 139 from exceeding that in the rest of the material around openings 132, 134. As a result, the magnitude of the magnetic flux in leg 139 will not have an effect on the magnitude of the switched flux of the material around openings 132, 134. The manner of connection windings 137, 138 to the other components of a free-running magnetometer is also illustrated in FIG. 13.

The longer cores 120, 130, are with respect to their width and thickness, the more sensitive they are to the magnitudes of the components of the earth's magnetic field and any other magnetic fields existing in the vicinity of the respective cores, substantially parallel to longitudinal axis 128 of core 120 or longitudinal axis 140 of core 130. The magnitudes of the magnetic field components substantially parallel to the longitudinal axis of the cores 120, 130 determine the magnitude of the control flux $\phi_d$ within the respective cores.

The magnitude of the control flux $\phi_d$, due to the permanent magnetism of the earth, is a maximum when the longiutdinal axes 128, 140 of cores 120, 130 are aligned with the resultant of the components of the earth's magnetic field and is a minimum when the longitudinal axes 128, 140 of cores 120, 130 lie in a plane at right angles to this direction. Rotation of cores 120, 130 about axes 129, 141 which are at right angles to longitudinal axes 128, 140, when axes 129, 141, are at right angles to resultant of earth's magnetic field components will produce maximum variation in the magnitude of the control flux $\phi_d$ and maximum changes in the frequency of free-running magnetic multivibrator associated with the respective cores. If the orientation of the longitudinal axes of cores 120, 130 are maintained substantially constant, any change in the magnitude or direction of the resultant of the earth's magnetic field will cause a change in frequency of the associated free-running magnetic multivibrators. The strength of the earth's magnetic field is substantially below the coercive force of the magnetic materials from which cores 120, 130 are formed so that the changes in the control field established are substantially reversible.

When it is desired to use magnetometers having cores shaped as illustrated in FIGS. 11 or 13, to measure the strength of a magnetic field, such as the earth's magnetic field, as distinguished from detecting changes in a magnetic field; the field to be measured may be neutralized by an equal and opposite magnetic field produced either by a biasing permanent magnet or magnets or by electromagnetic means. The sensitiveness of magnetometers having cores formed as illustrated in FIGS. 11, 13 are comparable with those obtained by the most sensitive magnetometers in current use.

From the foregoing it is believed clear that the type of magnetic multivibrator associated with the cores illustrated in FIGS. 6, 8, 9, 11, 13 is a matter of choice determined by the type of output signal desired.

The explanation of the manner in which the control flux in the core of magnetic multivibrators regulates the effective switching flux of the core, is the best explanation that has been developed to date. It is believed to be accurate and is supported by tests. It is, however, only the best theory for explaining the results observed known to the inventors at this time.

Obviously many modifications and variations of the present invention are possible in the light of the above teachings. It is, therefore, to be understood that within the scope of the appended claims the invention may be practiced other than as specifically described and illustrated.

What is claimed is:

1. A magnetometer comprising, in combination, an elongated magnetic core body composed of a plurality of similarly dimensioned thin laminations of magnetic material having substantially rectangular hysteresis loop characteristics, the length of said laminations being substantially greater than their width, said core body having a pair of closely adjacent apertures therethrough approximately midway between the opposite ends of the body and spaced apart from one another in the direction of the longitudinal dimension of the core body, said apertures being so located with respect to the lateral dimension of the core body that the widths of the magnetic material between the opposite outer sides of the body and the apertures are substantially equal and the apertures being so located with respect to one another that the width of the common leg portion of the core body therebetween is no less than twice the width of the material between the outer sides of the core body and the apertures, a multivibrator circuit including a pair of windings connected in parallel to a substantially constant unidirectional source of potential and inductively wound on said common leg portion of the core body and further including a pair of alternately conducting semiconductor devices interconnected with the windings and with one another and operable to cause the flux of the magnetic material of the leg portion to make repetitive traversals of its hysteresis loop at a high frequency rate, and an output winding inductively coupled to said leg portion of the core body and providing output signals responding to the frequency rate of the flux traversals, the variation in the frequency of the output signals being a function of the resultant magnitude of the components of any external magnetic fields in the vicinity of the core body which are substantially parallel to the longitudinal axis thereof.

2. A magnetometer comprising, in combination, an elongated magnetic core body composed of a plurality of similarly dimensioned thin laminations of magnetic material having substantially rectangular hysteresis loop characteristics, the length of said laminations being substantially greater than their width, said core body having an aperture therethrough approximately midway between the opposite ends of the body and so located with respect to the lateral dimension of the core body that the widths of the magnetic material between the opposite outer sides of the body and the aperture are substantially equal, a multivibrator circuit including a pair of windings connected in parallel to a substantially constant unidirectional source of potential and wound through the aperture and inductively about an adjacent common portion of the core body and further including a pair of alternately conducting semi-conductor devices interconnected with the windings and with one another and operable to cause the flux of the magnetic material of said common portion of the core body to make repetitive traversals of its hysteresis loop at a high frequency rate, and an output winding wound through the aperture and inductively about an adjacent portion of the core body and providing output signals responding to the frequency rate of the flux traversals, the variation in the frequency of the output signals being a function of the resultant magnitude of the components of any external magnetic fields in the vicinity of the core body which are substantially parallel to the longitudinal axis thereof.

References Cited in the file of this patent

UNITED STATES PATENTS

| | | |
|---|---|---|
| 2,407,536 | Chapman | Sept. 10, 1946 |
| 2,480,265 | Rubenstein | Aug. 30, 1949 |
| 2,587,481 | Kaehni et al. | Feb. 26, 1952 |
| 2,591,406 | Carter et al. | Apr. 1, 1952 |
| 2,783,384 | Bright et al. | Feb. 26, 1957 |
| 2,854,580 | Uchrin et al. | Sept. 30, 1958 |